United States Patent Office 2,985,539
Patented May 23, 1961

2,985,539
TREATED RED LEAD
Otto König, Forest Hills, N.Y., assignor to National Lead Company, New York, N.Y., a corporation of New Jersey
No Drawing. Filed Nov. 28, 1958, Ser. No. 776,676
3 Claims. (Cl. 106—297)

This invention relates to improved red lead pigments. In particular, this invention relates to the use of said red lead pigments in paints, and the resultant retardation of increases in viscosity and settling, upon standing for a length of time of said paint.

Although red lead is one of the most popular and useful anti-corrosion pigments on the market, paints made with red lead as a pigment suffer from the persistent disadvantage that they often increase in viscosity upon standing for a length of time, and some of the pigment tends to settle to the bottom of the paint container forming a hard mass which is extremely difficult, if not impossible, to redisperse in the entire paint. The increased viscosity, upon standing, tends to render the paint almost impossible to apply to any surface, if in fact one manages to move the paint brush through such a viscous mass.

An object of this invention therefore, is to provide an improved red lead pigment. Another object is to provide an improved red lead pigment for use in paints. Still another object is to provide an improved red lead pigment for use in paints, said paints being suppressed as regards the tendency of said pigment to settle into a hard, difficultly dispersible mass. Yet another object is to provide an improved red lead pigment for use in paints, said paints being suppressed as regards the tendency of said pigment to settle into a hard, difficultly dispersible mass, and said paint also being suppressed as regards the tendency of said paint to form a heavy viscous paint.

Broadly, this invention contemplates a pigment composition comprising red lead, and at least one additional composition selected from the class consisting of a lead salt of tetracarboxybutane, and a mixture of litharge and tetracarboxybutane. This invention also contemplates a method of suppressing the tendency of a red lead pigment to settle in a paint container, and the tendency of the paint to become increasingly viscous which comprises adding to said red lead pigment, a composition selected from the class consisting of a lead salt of tetracarboxybutane, and a mixture of litharge and tetracarboxybutane. In addition, this invention also contemplates a paint composition comprising red lead and an additional composition selected from the class consisting of a lead salt of tetracarboxybutane, and a mixture of litharge and tetracarboxybutane.

In a particularly desirable embodiment, this invention contemplates a composition as aforesaid wherein there is present up to about 15% of a lead salt of tetracarboxybutane based on the total weight of the original red lead composition and said lead salt. By tetracarboxybutane, we mean 1,2,3,4-tetracarboxbutane. While more of the lead salt of tetracarboxybutane may be present, there is no particular advantage in employing a greater amount.

The tetracarboxybutane itself, may be added to the red lead, but there should be present, an amount of free litharge capable of reacting with all of the tetracarboxybutane, as it is the lead salt of tetracarboxybutane which suppresses settling of the pigment in a paint vehicle and suppression of the tendency of a red lead containing paint to become increasingly viscous upon standing. If there is an excess, it should not be an excess of PbO, for reasons which will be more fully explained below. Generally speaking, it is preferred that a stoichiometric amount of tetracarboxybutane to the litharge present in the pigment be employed. An excess of tetracarboxybutane may be present, but there is no particular advantage in employing such an excess. Less than 15% of the lead salt of tetracarboxybutane may be present and still provide beneficial effects.

Not only are the anti-corrosive properties of a red lead paint retained when a lead salt of tetracarboxybutane is present, but said lead salt suppresses the tendency of the pigment to settle to the bottom of the paint container and also suppresses the tendency of said paint to become increasingly viscous upon standing for a length of time. The mechanism of this suppression of the tendencies of the paint to become viscous upon standing and to settle and form a hard mass is not fully understood.

The lead salt of tetracarboxybutane may be prepared by reacting tetracarboxybutane with the PbO present in the red lead pigment and then incorporating this pigment into the paint, or the tetracarboxybutane may be added dry directly to a dry red lead pigment without initially reacting the litharge present with the tetracarboxybutane, care being taken to insure that enough PbO is also present to react with the tetracarboxybutane present, after the pigment is formulated into a paint.

If the amount of PbO present in the red lead is such, that the PbO present is in excess of the amount required to react with the tetracarboxybutane, the phenomenon known as livering may occur. This livering tendency may be prevented by neutralizing the excess PbO with additional tetracarboxybutane for example, or in some other known manner.

In order to more fully illustrate the nature of this invention and the manner of practicing the same, the following examples are presented.

Example I

The red lead used in this example was a "low PbO" red lead prepared by the furnace process and containing 2.98% by weight of PbO. Two thousand grams of this lead containing 59.6 grams of PbO (0.267 mol) were suspended in two liters of distilled water and the suspension stirred vigorously by means of a mechanical stirrer. Then 31.3 grams (0.134 mol) of 1,2,3,4-tetracarboxybutane in powdered form were introduced over a five-minute interval. Agitation was continued for an additional ½ hour after which the suspension was allowed to settle overnight, and then filtered on a Büchner funnel. The filtered cake was washed with distilled water until the filtrate had a substantially neutral pH. The washed filter cake was then broken up and dried at 85°–95° C., and ground in a hammer mill.

Example II

The procedure of Example I was repeated except that no water was used, and the mixture was dry ground together in a ball mill until the mixture was uniform.

Example III

A paint using the pigment prepared according to Example I was formulated as follows:

| | Percent |
|---|---|
| Pigment | 70.4 |
| Vehicle | 29.6 |

All parts are parts by weight unless otherwise indicated. The vehicle was composed of 83.66% Glyptal #2454, which is a medium length linseed oil alkyd resin and 16.34% of Sovasol #5, which is an aliphatic petroleum mineral spirits.

A control was prepared in exactly the same manner except that the pigment contained no tetracarboxybutane or lead salt of tetracarboxybutane. The 70.4% of the control pigment contained 2.98% PbO, and 97.02% of $Pb_3O_4$. Both paints were allowed to stand for 36 days, and the consistency of both paints was measured at the conclusion thereof. The consistency measurements were accomplished via A.S.T.M. consistency test method D-562-55. At the end of the 36 day period, the control containing no lead salt of tetracarboxybutane had a consistency of 435 grams, while the paint wherein a lead salt of textracarboxybutane was used had a consistency of 280 grams. The original consistency of control was 330 grams, and the original consistency of the paint containing a lead salt of tetracarboxybutane was 250 grams.

*Example IV*

A control, identical with control of Example III was prepared except that the 70.4% of pigment was composed of 3.05% PbO, and 96.95% of $Pb_3O_4$.

A pigment was prepared according to the process of this invention, and in particular, in the manner of Example I except that 3.05% of PbO was used and a correspondingly larger stoichiometric amount of tetracarboxybutane was used. The formulation of the paint was the same as in Example I.

A second pigment was prepared according to the process of this invention, and in particular, in the manner of Example II. The pigment was prepared by dry mixing 3.05% PbO, 96.95% of $Pb_3O_4$ and a stoichiometric amount of tetracarboxybutane was used, said stoichiometric amount based on the amount of PbO present. A paint was formulated in the manner of Example III, that is 70.4% of the pigment mixture containing the tetracarboxybutane and 29.6% of vehicle.

All the three paints were allowed to stand for 36 days. It was found that at the end of 36 days, the control had a harder cake at the bottom of the paint receptacle then either of the other two paints which contained the treated pigment, treated according to Example I and the pigment prepared according to Example II. Both of these tetracarboxybutane treated pigments exhibited a very soft settling tendency of approximately one-eighth of an inch in height.

*Example V*

A control was prepared according to Example III. This control contained 11.3% of PbO, and 88.7% of $Pb_3O_4$. A paint was formulated in the manner of formulation of the control of Example III.

A pigment was prepared in the manner of Example II, except that there was present 11.3% of PbO, a stoichiometric amount of tetracarboxybutane, and the remainder was $Pb_3O_4$. A paint was prepared using the formulation of Example III, that is 70.4% of the mixture prepared according to Example II, and 29.6% of the vehicle.

The consistency of the paints was measured at the conclusion of the 36 day period and one day after the paints were prepared. The method used was the same as in Example III, that is A.S.T.M. D-562-55 consistency test method. The initial consistency of the control was 350 grams. The final consistency of the control was 700 grams. The initial consistency of the paint prepared according to this invention was 310 grams. The final consistency of the paint prepared according to this invention was 485 grams.

As is obvious from the foregoing examples, a pigment prepared according to the process of this invention when utilized in paints shows a marked effect in suppressing the tendency of the paint to become viscous upon standing and suppresses the tendency to harden into a solid mass at the bottom of the paint receptacle. The suppression of these tendencies should result in paints with a longer shelf life, and in a more consistent, uniform, and dependable product. The process itself, is a simple one and can readily be carried out by an operator without special skill or training.

In addition, as an interesting side note to this invention, the compositions according to this invention seem to show a marked ability to eliminate the livering problem present in red lead anti-corrosion paints.

While this invention has been described in terms of certain preferred embodiments and illustrated by means of specific examples, these are illustrative only, and the invention is not to be construed as limited, except as set forth in the following claims.

I claim:
1. A pigment composition consisting essentially of red lead, and at least one additive selected from the class consisting of a lead salt of tetracarboxybutane, and a mixture of litharge and tetracarboxybutane, said additive being present in the amount of from 4.24% to about 15% by weight based on the combined weight of said red lead and said additive; said litharge and said tetracarboxybutane being present in the proportion of at least 1 mole of tetracarboxybutane per 2 moles of litharge.

2. A method of suppressing the tendency of a red lead pigment to settle in a paint vehicle, and the tendency of the paint to become increasingly viscous which comprises adding to said red lead pigment, at least one additive selected from the class consisting of a lead salt of tetracarboxybutane, and a mixture of litharge and tetracarboxybutane, said additive being present in the amount of from 4.24% to about 15% by weight based on the combined weight of said red lead and said additive; said litharge and said tetracarboxybutane being present in the proportion of at least 1 mole of tetracarboxybutane per 2 moles of litharge.

3. A paint composition containing a pigment composition according to claim 1.

References Cited in the file of this patent

UNITED STATES PATENTS

| 2,182,436 | Johnstone | Dec. 5, 1939 |
| 2,236,296 | Minich et al. | Mar. 25, 1941 |
| 2,836,483 | Schulz | May 27, 1958 |

FOREIGN PATENTS

| 26,322 of 1896 | Great Britain | Oct. 2, 1897 |
| 264,492 | Great Britain | Feb. 9, 1928 |
| 147,659 | Australia | Aug. 5, 1952 |